United States Patent
Rempel et al.

(10) Patent No.: US 10,648,827 B2
(45) Date of Patent: May 12, 2020

(54) SYSTEM TO PROVIDE REAL-TIME RAILROAD GRADE CROSSING INFORMATION TO SUPPORT TRAFFIC MANAGEMENT DECISION-MAKING

(71) Applicant: MORR Transportation Services, Winnipeg (CA)

(72) Inventors: Garreth Rempel, Winnipeg (CA); Neil Ternowetsky, Winnipge (CA); Mark Reimer, Winnipeg (CA); Chao Bian, Winnipeg (CA)

(73) Assignee: TRAINFO CORP., Winnipeg, Manitoba (CA)

( * ) Notice: Subject to any disclaimer, the term of this patent is extended or adjusted under 35 U.S.C. 154(b) by 0 days.

(21) Appl. No.: 15/146,391

(22) Filed: May 4, 2016

(65) Prior Publication Data
US 2019/0145791 A1 May 16, 2019

Related U.S. Application Data

(60) Provisional application No. 62/158,172, filed on May 7, 2015.

(51) Int. Cl.
*G01C 21/34* (2006.01)
*B61L 29/32* (2006.01)
*G08G 1/00* (2006.01)
*G08G 1/0968* (2006.01)
*B61L 29/24* (2006.01)

(52) U.S. Cl.
CPC ........ *G01C 21/3492* (2013.01); *B61L 29/243* (2013.01); *B61L 29/32* (2013.01); *G01C 21/3461* (2013.01); *G08G 1/096833* (2013.01); *G08G 1/202* (2013.01)

(58) Field of Classification Search
USPC ........................................................ 701/410
See application file for complete search history.

(56) References Cited

U.S. PATENT DOCUMENTS

| | | | | |
|---|---|---|---|---|
| 2005/0164673 A1* | 7/2005 | Ehlers | ............. | G08G 1/096811 455/404.1 |
| 2005/0209770 A1* | 9/2005 | O'Neill | ............. | G01C 21/3407 701/117 |
| 2013/0204521 A1* | 8/2013 | Liu | .................... | G01C 21/3492 701/423 |
| 2013/0289805 A1* | 10/2013 | Makkinejad | .......... | B61L 25/025 701/19 |
| 2014/0085107 A1* | 3/2014 | Gutierrez | ......... | G08G 1/096766 340/905 |
| 2014/0330526 A1* | 11/2014 | Allen | .................. | G01M 5/0025 702/34 |

* cited by examiner

*Primary Examiner* — Tyler D Paige
(74) *Attorney, Agent, or Firm* — Michael R. Williams; Ryan W. Dupuis; Ade & Company Inc.

(57) ABSTRACT

A system that automatically communicates the event or potential event of a blocked railroad grade crossing to various users, including but not limited to emergency dispatchers and drivers, news media, traffic management systems, and the general public, specifically the location, time, and duration of the event or potential event. The system applies multiple technologies to detect the presence of activity on a rail line, transmits this detection data to a database, performs various analyses on the data, and communicates the status of grade crossings (blocked, potentially blocked, upcoming blockage, or clear) to assist various users with information to make more informed decisions.

8 Claims, 3 Drawing Sheets

SYSTEM TO PROVIDE REAL-TIME RAILROAD GRADE CROSSING INFORMATION TO SUPPORT TRAFFIC MANAGEMENT DECISION-MAKING

PRIOR APPLICATION INFORMATION

The instant application claims the benefit of U.S. Provisional Patent Application Ser. No. 62/158,172, filed May 7, 2015, now abandoned.

FIELD OF THE INVENTION

This invention relates generally to systems for data collection, communication, and analysis and, more particularly, to systems for determining and communicating the current and predicted status of at-grade railroad crossings in real-time. More specifically, the invention relates to a system and a method for dispatching a vehicle along a particular route so that blocked or closed railroad crossings are avoided by the vehicle.

BACKGROUND OF THE INVENTION

Providing motorists with information about potential railroad grade crossing delays facilitates the planning and selection of travel routes to avoid and/or to minimize travel time delays between origins and destinations where a railroad grade crossing may be impassable. This would reduce travel time, improve travel time reliability, and offer insight into traffic operations at blocked grade crossings. These benefits are directly applicable to emergency response services, municipal transportation services, and other road users, including the general public.

Emergency response services include fire, police, and paramedic services that typically are first responders to an incident and need to reach the locations of incidents as quickly as possible. These services generally have a central dispatching centre. Dispatchers at these centres then direct emergency response vehicles such as an ambulance, fire engine, police car or other emergency vehicle to selected locations and/or street addresses.

Most jurisdictions establish their own emergency response time parameters and minimum performance standards. These parameters typically comprise a maximum dispatch time and a maximum travel time to an emergency. The dispatch time is the elapsed time between a dispatcher receiving an alarm call and an emergency response facility (e.g., fire station) or field unit (e.g., police cruiser) receiving this call from the dispatcher. Best practices for processing alarm calls (dispatching) requires completion times of 60 seconds for 80% of calls and 106 seconds for 95% of calls. Emergency response units, specifically for a fire suppression incident, must meet a travel time requirement of 240 seconds for 90% of calls. Currently, dispatchers and emergency response units do not know a priori if a railroad grade crossing will be passable on their routes until they arrive at a crossing. When this event occurs, it results in the dispatcher calling a second unit to respond to the emergency event or, if possible, rerouting the first unit. Both responses to an impassable railroad grade crossing can result in unacceptable emergency response times that can lead to loss of life, increased seriousness of injuries and/or higher property damage costs.

Municipal transportation services are responsible for traffic operations within their jurisdiction. Traffic operations include facilitating the movement of people and goods through effective transportation networks, including operating public transit. Many large jurisdictions have, or are creating, traffic management centres to allow traffic engineers to respond to traffic conditions in real-time to reduce traffic congestion, respond to inclement driving conditions, or route vehicles around choke points, such as accidents.

PBX Engineering has developed a railway crossing information system (RCIS) along a rail corridor running through the City of Surrey and the City of Langley in British Columbia. This system is designed to alert motorists about train delays and provide traveler information to help reduce congestion and travel delays. At present, there is no emergency response component to this system.

The RCIS was initiated by Port Metro Vancouver to improve travel time for motorists, provide environmental benefits in terms of reduced vehicle emissions, increase infrastructure capacity, and establish transparency about rail activity to the community. The RCIS operates along a 4.4 km length corridor. There are four major at-grade crossings, seven train detector stations, nine motorist advisory signs, and a central control system. Train detectors provide data on train speed, direction, and length and are located off rail right-of-way. The RCIS includes a prediction algorithm to estimate the train arrival time at each crossing and the blockage duration. Train position is confirmed using mid-corridor train detectors and interconnected traffic signals where available. The system updates traveler information signs as the train progresses along the corridor. Each train detector station has four train detection radar units, one speed radar unit, three digital cameras, and a control cabinet. These stations can detect trains and determine their direction nearly 100% of the time and estimate train speed and length to about +/−3-9% accuracy.

The Texas Transportation Institute (TTI) has conducted research to monitor railroad movements in a corridor and provide train-related information to multiple agencies. They developed a prototype named RailTrac System which includes field, telecommunication, central processing, and user interface components.

The RailTrac System uses trackside Doppler radar sensors spaced between 1600 and 2600 metres apart to detect a train and measure its speed, direction, and length. These sensors can detect trains at a distance of up to 30 metres; however, they require access to infrastructure such as a pole for mounting, power, and telecommunications. Furthermore, they need to be mounted at least six metres above the train to minimize the detection of background movement which could falsely identify a train. Readings from the sensors are processed by an internal algorithm to identify and reject false signals and to estimate train length, position, and speed.

TTI also developed a Railroad Grade Crossing Monitoring System which examined how real-time detection, communication, and information systems can be integrated to monitor the movements of trains in a corridor to reduce conflicts and delays created by railroad grade crossings for the primary benefit of fire and police personnel. Specifically, this project conducted a pilot test for a 6.4 mile rail corridor in Sugar Land County in Texas. This rail corridor is operated by Union Pacific, averages more than 30 trains per day, and passes through two fire department districts.

The project developed a train monitoring system capable of detecting a train and determining its travel direction, speed, and length. It also monitored crossing gate closures using traffic signal information. The system integrates this data to estimate real-time train status and projects downstream crossing closures and clearance times.

The major difference between this system and the RailTrac System in the previous section is the information output process and interface. Whereas the RailTrac System provided tabular data, this system provides a graphical and map-based output. This map was displayed on a dedicated screen located within the police and fire station buildings.

Cisco is developing a management system for emergency response vehicles that is built upon the "Internet of Things" concept. The Internet of Things is a vision of connecting objects via wireless communication protocols such as wi-fi and 3G cellular networks. Cisco's application of the Internet of Things for emergency response vehicles involves deploying IP networks, routers, switches, and surveillance cameras across a city to monitor various elements of an emergency call. Their plan is to use GPS to track emergency vehicles in real-time and vehicle-to-infrastructure (V2I) communication to allow emergency vehicles to communicate with traffic signals, rail crossings, traffic cameras, and roads.

Cisco's vision for their Connected Emergency Response and Public Safety initiative is extensive and complex and involves much more than intelligently routing emergency vehicles to avoid delays at train crossings. It also involves monitoring tire pressure and oil levels of vehicles, transmitting data via the cloud regarding the location of fire hydrants and characteristics of the emergency scene, altering traffic signals across a road network to accommodate various emergency response vehicles from across the city, and sending data wirelessly to fire, police, nearby hospitals, and hazardous material dispatchers to help prepare other first responders and medical personnel.

Clearly, a system that would provide individuals, for example, a dispatcher, with information regarding the closure of railroad grade crossings as early as possible would have several benefits, for example, reducing the risk of an emergency response vehicle encountering an unexpected delay as a result of an impassable railroad grade crossing. Specifically, such a system would enable dispatchers to select the appropriate emergency response facility and/or travel route to avoid or minimize delays caused by blocked grade crossings.

SUMMARY OF THE INVENTION

Accordingly, it would be advantageous to provide users with a system that gives advanced warning of routes and locations where delays will be experienced due to impassable railroad grade crossings. To meet this, the invention provides a data collection method that detects blocked railroad grade crossings, a methodology to predict the next grade crossing blockage, the time until a blockage occurs at the predicted location, and the elapsed time of blockage at current and predicted grade crossing locations. This information is communicated to the preferred medium of the end user through a secure private data connection so that the vehicle in question can be routed or re-routed accordingly. In some embodiments, the collected data is stored in a database which is accessed by the control unit of the system to predict likely outcomes of subsequent blockages or events based on historical information.

According to a first aspect of the invention, there is provided a method of dispatching a vehicle to a destination comprising: providing a railroad system comprising a plurality of monitored railroad grade crossings, each respective one monitored railroad grade crossing having associated therewith a monitor, said monitor arranged to detect an event at the respective one monitored railroad grade crossing, said event selected from closing of the associated monitored railroad grade crossing or approach of a train to the associated monitored railroad grade crossing, said monitor arranged to report said event to a control unit, said control unit comprising: a database comprising a plurality of event entries, each respective event entry comprising closing start time and closing stop time of one event at a respective monitored railroad grade crossing closed by the one event; and a plurality of itinerary entries, each respective itinerary entry comprising closing start times and closing stop times at each respective monitored railroad grade crossing closed by the one event; each respective railroad grade crossing being intersected by a roadway, said roadway being blocked when the railroad grade crossing is closed; communicating an event at a monitor to the control unit, said control unit: a) consulting the database to determine itinerary most frequently followed by a train from the respective monitored railroad grade crossing associated with said monitor; and b) reporting predicted time of closure of railroad grade crossings associated with said itinerary to a user; and said user dispatching the vehicle to the destination on a route that avoids said closed railroad grade crossings.

According to a further aspect of the invention, there is provided a method of regulating traffic at a railroad grade crossing comprising: providing a railroad system comprising a plurality of monitored railroad grade crossings, each respective one monitored railroad grade crossing having associated therewith a monitor, said monitor arranged to detect an event at the respective one monitored railroad grade crossing, said event selected from closing of the associated monitored railroad grade crossing or approach of a train to the associated monitored railroad grade crossing, said monitor arranged to report said event to a control unit, said control unit comprising: a database comprising a plurality of event entries, each respective event entry comprising closing start time and closing stop time of one event at a respective monitored railroad grade crossing closed by the one event; and a plurality of itinerary entries, each respective itinerary entry comprising closing start times and closing stop times at each respective monitored railroad grade crossing closed by the one event; each respective railroad grade crossing being intersected by a roadway, said roadway being blocked when the railroad grade crossing is closed; communicating an event at a monitor to the control unit, said control unit: a) consulting the database to determine most frequent itinerary followed by a train from the respective monitored railroad grade crossing associated with said monitor; b) calculating time of closure of railroad grade crossings associated with said itinerary; and c) altering timing of traffic lights associated with each railroad grade crossing on said itinerary so that vehicles clear the railroad grade crossing prior to closure.

According to another aspect of the invention, there is provided a method of notifying freight facilities and freight logistics companies about approaching trains comprising:

providing a railroad system comprising a plurality of monitored railroad grade crossings, each respective one monitored railroad grade crossing having associated therewith a monitor, said monitor arranged to detect an event at the respective one monitored railroad grade crossing, said event selected from closing of the associated railroad grade crossing or approach of a train to the associated railroad grade crossing, said monitor arranged to report said event to a control unit, said control unit comprising a database comprising a plurality of event entries, each respective event entry comprising the closing start time and the closing stop time of one event at a respective monitored railroad grade crossing closed by the one event; and a plurality of itinerary entries, each respective itinerary entry comprising the closing start times and the closing stop times at every respective monitored railroad grade crossing closed by the event; each respective monitored railroad grade crossing being intersected by a roadway, said roadway being blocked when the railroad grade crossing is closed;

communicating an event at a monitor to the control unit, said control unit consulting the database to determine if the predicted itinerary includes a stop at a freight facility of interest; and wherein if the itinerary includes said freight facility, informing the freight facility of the approaching trains.

DESCRIPTION OF THE PREFERRED EMBODIMENTS

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described. All publications mentioned hereunder are incorporated herein by reference.

Described herein is a system and a method of using the system that reduces the risk of a vehicle, for example, an emergency response vehicle, encountering an unexpected delay as a result of an impassable railroad grade crossing. Specifically, it enables dispatchers to select the appropriate emergency response facility and/or travel route to avoid or minimize delays caused by blocked grade crossings.

As used herein, a dispatcher refers to an individual who dispatches a vehicle, for example, a dispatcher of an emergency vehicle, such as a police car, ambulance, fire truck or the like, or a dispatcher of a shipping vehicle, a delivery vehicle, a transit vehicle, a delivery vehicle or a taxi cab, from a first location to a second location. However, a user who is the driver of a vehicle may dispatch their vehicle along a particular route by driving along a particular route, especially after receiving notification of a railroad grade crossing closing from the control unit of the invention as discussed herein. For example, the notification may be a notification sent directly and specifically to the user, for example, by a text message, or when the user is a dispatcher, by updates to an interactive map or other form of message, as discussed below. Alternatively, the notification may be a general notification, such as to all users of a navigational aid such as a GPS or may be a digital sign which displays a message from the control unit of the invention regarding an impending railroad grade crossing closure.

The system can also provide information on railroad grade crossing blockages to other users, such as for example but by no means limited to: motorists who may alter their route to avoid the closed crossing(s) or who may decide that the duration of blockage is short enough that rerouting is not warranted; transit users, who will be informed of bus delays due to railroad grade crossing closures; and municipal traffic controllers who can adjust traffic light patterns before a train reaches a specific railroad grade crossing as well as after the train has cleared the closed crossing, thereby reducing traffic congestion associated with closed crossings.

As discussed herein, the system relies on several types of spatial monitoring technologies distributed throughout a rail network within a jurisdiction. Monitors used in this system include those that can detect or receive a signal that indicates a portion of track is currently occupied by an object. For example, the monitor may be linked to the track circuit which triggers the crossing signal so that triggering of the track circuit is reported. Alternatively, the monitor may be an acoustic monitor. Preferably, the acoustic monitor has a limited range so that the acoustic monitor detects the sound of railcar axles passing the acoustic monitor. As a result of this arrangement, the acoustic monitor can be used to determine the approximate length of a train by counting the number of axles as well as measuring the speed of the train by measuring the time between axles. Yet further, tracking of the time between axles can be used to determine changes in the speed of the train, that is, acceleration or deceleration.

It is of note that combinations of track circuit monitors, acoustic monitors and other suitable monitors known in the art may be used within the invention and are encompassed by the term "monitor" as used herein unless otherwise explicitly stated.

With monitors identifying portions of track currently occupied, predictive algorithms are used to determine the following:

Is the object a train?
What direction is the object moving?
What speed is the object travelling at and is that speed changing?
How long is the object?
When is the object expected to block an at-grade crossing?
When is the object expected to clear an at-grade crossing?
When will the object clear the jurisdiction?
If the object is a train, what path will the train follow within the jurisdiction?

Each monitor will either obtain power by tying in to existing municipal infrastructure (where available) or being battery powered with a recharge source on site, such as solar panel or wind generation. Each monitor will be enabled with global system for mobile communications (GSM) or satellite communications capabilities to send data to the central database.

The location of some emergency response facilities are in part influenced by the presence of a railway and the reduced catchment area (i.e., total area that a facility can serve within required response times) experienced during unexpected grade crossing delays. Therefore, this invention offers an opportunity to increase catchment areas for certain facilities which can reduce the number of facilities required to service an area, increase vehicle fleet utilization, and/or reduce total fleet size.

Furthermore, as discussed herein, the system increases the ability of traffic engineers to respond to impassable railroad grade crossings in a timely manner. Currently, traffic signals, if warranted, may be interconnected with railroad grade crossing warning systems. These systems prioritize traffic movements that are not blocked by the grade crossing. Using the data collected by the system of the invention and applying its predictive algorithms, traffic engineers can clear vehicle queues when crossings are blocked as well as after a crossing has been blocked or between blockages if more than one train will travel through the crossing in a short period of time, for example, by prioritizing traffic movements that have been blocked by the railroad grade crossing when appropriate. Clearing traffic queues at grade crossings reduces congestion and also benefits emergency responders and public transit by reducing travel delays.

Furthermore, since grade crossing blockage information is available in real-time, this information can be integrated with transit notification systems to identify unexpected service delays earlier and notify transit riders.

Road users include active transportation users (such as pedestrians and cyclists), automobile drivers and passengers, and urban goods and service providers. Generally, an impassable grade crossing will result in traffic backing up and lead to travel time delays for various users. These delays can have economic impacts through reduced productivity, increased fuel consumption, and less timely delivery of goods. Further, large traffic queues can impact emergency response services by increasing response times despite a grade crossing being cleared.

The system described herein is capable of warning road users of grade crossings that are impassable on their route or upcoming grade crossing blockages that may occur. Integrating data collection, analysis, and delivery in conjunction with the predictive algorithms discussed herein to warn road users improves the ability of users to select the optimal route for their purpose, that is, to dispatch the vehicle along the appropriate route. This in turn will reduce overall traffic congestion in the vicinity of grade crossings. This function is particularly valuable at grade crossings that experience high volumes of rail and road traffic where traffic queues can form due to a blockage and fail to dissipate prior to a second grade crossing event occurring. Enabling road users to select alternative routes prior to arriving at a blocked grade crossing reduces overall congestion and contributes to the improvement of average emergency response times by reducing unexpected delays during an emergency response. Further, there is often pressure on public agencies to construct railway grade separations (e.g., underpasses) due to traffic congestion and travel delays experienced at these locations by the general public. The invention will help road users choose alternative routes to avoid these delays.

Accordingly, it would be advantageous to provide the users with a system that gives advanced warning of routes and locations where delays will be experienced due to impassable railroad grade crossings. To meet this, the invention provides at least a data collection method that detects blocked railroad grade crossings, measures train speed, changes in train speed, and determines the length of the train, as well as a methodology to predict the next grade crossing blockage; the time until a blockage occurs at the predicted location; and the elapsed time of blockage at current and predicted grade crossing locations. This information is communicated to the preferred medium of the end user through a secure private data connection.

As discussed herein, the data collection and communication system may be integrated with roadside equipment that already exists or, when existing equipment is not available, may be independently installed outside the railroad right-of-way. In some embodiments, the invention detects railroad communication signals that indicate an upcoming event that will cause a grade crossing blockage. In some embodiments, the monitor is an acoustic monitor that detects the sound of railcar axles passing the acoustic monitor In some embodiments, the invention is capable of detecting events through remote sensing technologies that indicate the potential for a grade crossing blockage. Such communication signals are well known in the art. As will be appreciated by one of skill in the art and as discussed herein, these embodiments are not mutually exclusive. This event data is transmitted through wireless communication systems to a central database where it is processed using algorithms and sent to the various end users through a private data connection in their preferred medium.

As a result, the system provides advanced warning to the various end users for grade crossings that are either currently blocked or predicted to be blocked in the near future, for example, when the vehicle being dispatched would reach the railroad grade crossing. Knowing the blocked status of a grade crossing enables users to make informed decisions on their travel route prior to leaving an origin or make adjustments while on route. Altering route choice before and during a trip may reduce overall travel time and can alleviate traffic congestion.

As discussed herein, the predictive algorithms provide the user with an advanced warning of upcoming blockages at grade crossings that may be currently clear, the duration of existing and upcoming delays, and the time until a grade crossing will be clear. The algorithms rely on data collected by the monitors used in the system and statistical calculations performed on this data, as discussed herein.

Specifically, as discussed herein, the invention uses a network of monitors to detect events at various grade crossing locations. As discussed herein, each monitor is associated with at least one railroad grade crossing that is being monitored. For example, in some embodiments, the monitor may be situated between two railroad grade crossings and/or may be otherwise associated with two railroad grade crossings, depending on the direction in which the train being monitored by the system is travelling. As discussed herein, the monitors are arranged to detect the activation of their respective associated railroad grade crossing or provide an updated status of an event between railroad grade crossings or detect the presence of an object moving towards the railroad grade crossing.

When a monitor detects a railroad grade crossing closure and/or an event, the monitor communicates that the crossing with which the monitor is associated is blocked or is about to be blocked.

As used herein, an "event" refers to something that results in the activation of the monitor. While this event may be the approach of a train which is detected by the monitor and/or activates the railway grade crossing, it may also be the closing of a crossing for maintenance or activation of the crossing through either malfunction or vandalism. Furthermore, all trains passing through a first crossing will not all be travelling at the same speed, will not all be of the same length and may not take the same route through the railway system.

For example, the train may be a manifest train (a mixed freight train having a mixture of car types and cargos), a unit train (transporting a single commodity), a container train (transporting intermodal containers stacked two high on railroad cars) or a passenger train.

As will be appreciated by one of skill in the art, if the event is a train, it will encounter a second monitor associated with a second railroad grade crossing or intermediate point following a first time interval and will encounter a third monitor associated with a third railroad grade crossing or intermediate point following a second time interval and so on. Independent of encountering the second monitor and the third monitor, following a third time interval, the event will cease to activate the first monitor, that is, will exit the detection zone of the first monitor, that is, the train exits the first railroad grade crossing or intermediate point.

Accordingly, the first monitor will report to the control unit the time at which the first monitor was first activated as well as the time at which activation ceased. Similar reports are sent by all of the monitors activated by the event which represents all of the railroad grade crossings blocked by the event. This represents the route followed by the train through the railway system. Calculating the elapsed blockage time at each crossing affected by the event and the travel time between each railroad grade crossing by the event provides the event series or itinerary for the event. As discussed herein, the data entries from each respective monitored railroad grade crossing or intermediate point are referred to herein as "event entries". Furthermore, the control unit analyzes all of the entries for each event, generating a data entry referred to herein as an "itinerary entry".

In some embodiments, the itinerary is integrated with information regarding railroad operations. This knowledge includes temporal and spatial changes that occur due to seasonal shipping changes (such as harvest time and Christmas), temperature (cold winters result in shorter trains due to braking requirements), railroad speed limits, and the location of assets (points on the rail network where rail-related trips may originate or terminate). Further knowledge of railroad operations, including governing lengths on trains due to maximum siding lengths on a railroad route, and the lengths of various types of trains (such as manifest, unit, and container trains) is also considered. The algorithms use this information to determine the probability of a subsequent crossing being blocked based on the probability of a rail vehicle deviating from the primary network or route into for example a rail yard, industry connection, or other asset for extended periods of time. Maximum speed limits on track segments provide expected rail vehicle speed thresholds (including acceleration and deceleration) between grade crossings.

Furthermore, in embodiments wherein the monitor is an acoustic sensor, the acoustic monitor can be used to determine the approximate length of a train by counting the number of axles as well as measuring the speed of the train by measuring the time between axles. Yet further, tracking of the time between axles can be used to determine changes in the speed of the train, that is, acceleration or deceleration. As will be appreciated by one of skill in the art, the average speed and/or the speed at individual monitors and/or crossings can be recorded. In addition, specific crossings and/or monitors where changes in speed are observed can also be identified. Finally, time points during a crossing closure at which the speed of the train changed, either by accelerating or decelerating can also be recorded. This information can also be added to the database as characteristics of an itinerary. In this manner, the system compiles information on each event at each crossing and links the related events together, thereby forming an itinerary which includes the time of closing and re-opening of each crossing. As will be appreciated by one of skill in the art, this is comprehensive information on each train that passes through the monitored sections of the railway, showing how long each crossing was closed by the passing of the train and the travel time between each crossing. This information is then corrected for railroad operation information. Specifically, temporal and spatial changes due to for example seasonal shipping changes and temperature are taken into consideration when determining the itinerary followed by the train and the itinerary is then stored in the database.

In use, when the control unit receives notification or a report from a monitor, the control unit cross references to the database to identify the monitored railroad grade crossing that is, or is about to be, blocked, that is, to identify the railroad grade crossing associated with the monitor that has detected the event.

Based on the database, the control unit predicts what the event will do next. That is, the control unit consults the database to determine what the most likely itinerary is for the event. If the next occurrence of the event does not follow the predicted path or itinerary, the control unit will again consult the database and determine if this event is following a less common itinerary, that is, the control unit will look to justify the lack of predictability. If the event's lack of predictability cannot be justified, the control unit treats the event as an anomaly.

For example, the event may reach the next railroad grade crossing for the predicted itinerary more quickly or more slowly than expected in the predicted itinerary. Alternatively, the event may reach a different railroad grade crossing than what was expected or predicted by the itinerary, indicating a different than expected route is being followed by the event. Or the event may not reach any crossing, indicating that the event may have gone to a side track, rail yard or other asset. Or the event may exit the current railroad grade crossing more slowly than predicted, more quickly than predicted or may not exit the crossing for an extended period of time. When a situation such as this arises, the control unit consults the database to find either the next most frequent itinerary for an event at the respective railroad grade crossing or the itinerary that most closely matches the characteristics of the event as discussed herein.

That is, when a monitor is activated, the control unit consults the database and determines what the most likely outcome is, and in some embodiments, is based on integration with the railroad operation information discussed above. This is the predicted itinerary for the new event, and comprises the expected duration of time of blockage at the first railroad grade crossing and the length of time until each of the railroad grade crossings in series along the predicted itinerary or expected route will be blocked and the duration of time for which they will be blocked. This information is then projected or distributed throughout the network to provide the various users with projected blocked and cleared times of grade crossings along each segment of railroad track within the jurisdiction as discussed below. This information is then used for example by a recipient or user to dispatch vehicles for example emergency vehicles along routes to destinations that will not be encounter or otherwise be delayed by blocked railroad grade crossings or by traffic managers to reduce traffic congestion caused by blocking of railroad grade crossings.

It is important to note that by virtue of the information stored on the database and the use of the predictive algorithms to determine the most likely outcome by integrating the railroad operation information, this information is provided based on a single monitor being activated and is provided to users prior to the blockage clearing the first monitor. That is, because of the use of the database and the predictive algorithms, information is provided to users much sooner than reporting systems which must wait for a train to clear the first detector encountered to calculate time of blockage or require two or more signals to determine the speed and/or length of a train and use that information to predict crossing blockages along a rail section. The control unit then begins a countdown corresponding to when the blockage is expected to clear. If the actual blockage clear time does not fall within the expected time window, the control unit identifies the blockage as an anomaly, an incident, or an expected event. The control unit may also begin a countdown corresponding to when the event is expected to encounter the next monitor in series. Anomalies are ignored, incidents are reported and expected events are processed further.

For example, an expected event may be an event that is not the most likely event but one that is often encountered. For example, the most common event at a given railroad grade crossing may follow a specific itinerary, such as a manifest train that takes a specific route; however, a different class of event such as a unit train that only partially follows the same route and then stops at an asset would have a different itinerary. Similarly, passenger trains are much shorter than freight trains and would result in a blockage that was cleared much more quickly. Passenger trains also tend to follow a more regular schedule.

Thus, when an event occurs, the algorithms reference the threshold values to identify the most likely subsequent event to occur (such as the next grade crossing that will be blocked or the duration of the current block event or the time interval until the event reaches the next crossing in series). These thresholds, in some instances, may be heavily influenced by industry intelligence related to seasonality, temperature, rail assets, and other operational characteristics as discussed above. If the most likely event does not occur within a pre-defined threshold, the algorithm identifies the next most likely subsequent event to occur, again by referencing the pre-defined thresholds in the database. The algorithms continue to reference thresholds and identify subsequent events until all thresholds have been applied or a subsequent event has been successfully predicted. These predicted events are the output of the predictor processor and are stored in the central database (to recalculate blockage trends and thresholds after each event) and relayed to the end-user in real-time.

Once the expected event has been identified, corrected information is projected throughout the network to provide the various users with updated blocked and cleared times of grade crossings along each segment of railroad track within the jurisdiction that will be affected by the revised predicted itinerary. This may include adjustment on closing time and closing durations of specific railroad grade crossings based on the speed of the train and/or any changes in the speed of the train. As will be apparent to one of skill in the art, changes in speed may be mandatory in certain locations, based on the type of area the train is entering.

As will be appreciated by one of skill in the art, as the predicted itinerary is constantly being updated as more information is made available to the control unit and more thresholds are met. in some embodiments, the control unit reports closures to users with an accompanying confidence value which indicates how likely it is that the predicted itinerary is correct. Alternatively, in other embodiments, when two or more possible itineraries are equally likely or very close to equally likely, the control unit may initially provide confidence factors for two or more distinct itineraries wherein the likelihood of two or more distinct sets of railroad grade crossings being closed, the duration of the closing and the expected time until closing.

The algorithms calculate multiple metrics on elapsed time between blocked crossings and the blockage duration using the timestamps provided by the monitoring equipment. Further, the algorithms use collected data to estimate railroad vehicle length and its travel direction. This information may be recorded with the itinerary entry or may be recorded separately.

The central database stores the raw data collected and the data developed by the algorithms. From the data developed by the algorithms, blockage trends (such as frequency, time of day, duration, and estimated vehicle length) are created for each grade crossing and updated in real-time after each blockage event.

Each time an event is detected by the system, the data is used to update and refine the predictive algorithms. Real-time data collection and algorithm refinement ensure that changes in network operating characteristics are reflected in the predicted blockage times of railroad grade crossings.

In this manner, the system develops blockage trends for each grade crossing and segment of track throughout the entire rail network which is used to continually improve blockage prediction accuracy. Such a system provides traffic management decision makers and dispatchers with the tools necessary to make informed and timely decisions to save resources and, in the case of emergency response service dispatchers, mitigate the severity of an incident and potentially save lives.

As discussed above, the critical factor in dealing with an emergency situation, is the response time. Accordingly, providing a dispatcher with information on railroad grade crossing closures as quickly as possible allows the dispatcher to dispatch the emergency vehicle on a route that will not be delayed by the crossing blockage(s).

In one aspect of the invention, there is provided a method of dispatching a vehicle to a destination comprising:

providing a railroad system comprising a plurality of monitored railroad grade crossings and intermediate points, each respective one monitored railroad grade crossing having associated therewith a monitor, said monitor arranged to detect an event at the respective one monitored railroad grade crossing, said event selected from closing of the associated railroad grade crossing or approach of a train to the associated railroad grade crossing, said monitor arranged to report said event to a control unit, said control unit comprising a database comprising a plurality of event entries, each respective event entry comprising the closing start time and the closing stop time of one event at a respective monitored railroad grade crossing closed by the one event; and a plurality of itinerary entries, each respective itinerary entry comprising the closing start times and the closing stop times at every one respective monitored railroad grade crossing closed by the event; each respective railroad grade crossing being intersected by a roadway, said roadway being blocked when the railroad grade crossing is closed;

communicating an event at a monitor to the control unit, said control unit:

a) consulting the database to determine most frequent itinerary followed by a train from the respective monitored railroad grade crossing associated with said monitor; and b) reporting predicted time of closure of railroad grade crossings associated with said itinerary to a user; and said user dispatching the vehicle to the destination on a route that avoids said closed railroad grade crossings.

As will be appreciated by one of skill in the art, the user may be a dispatcher who is dispatching an emergency vehicle. In these embodiments, the dispatcher may inform the driver of the emergency response vehicle on what route to take to avoid a closed crossing or may dispatch the emergency response vehicle from a different station, as discussed above.

In these embodiments, the control unit may report the information to the dispatcher such that the information is integrated into an interactive map of the jurisdiction which indicates which crossings are closed.

Alternatively, the user may be the driver of a vehicle to whom the closure of a crossing is reported. In these embodiments, the control unit may inform a GPS system which notifies a driver with a GPS unit that a crossing on their programmed route or a crossing that is nearby their route is blocked or closed.

In other embodiments, the control unit may report to the user through a text message or through a mobile communication application that informs the user of a blocked crossing. Typically, the crossing will be a crossing that the user frequently crosses, for example, a railroad grade crossing on their route to and from work.

In some embodiments, the predicted itinerary is corrected or modified to include railroad operations information.

For example, the railroad operations information includes taking into account the temperature, current season, railroad speed limits, common train lengths, location of assets and the like, as discussed above.

In some embodiments, the event entry comprises the time and date of the closing of the monitored railroad grade crossing and the time and date of reopening of the monitored railroad grade crossing.

In some embodiments, the control unit applies a threshold value related to the predicted itinerary to the monitor and if the threshold value is not met, the control unit consults the database and selects a new predicted itinerary which is reported to users.

In some embodiments, the assigning of a threshold value is repeated until the threshold value is met. As will be appreciated by one of skill in the art, the meeting of the threshold value is a strong indication that the predicted itinerary is accurate.

As will be appreciated by one of skill in the art, in this manner, the prediction of closures of railroad grade crossings is continually being updated once an event is first detected by a monitor by communication between all monitors encountering the event and the control unit.

As discussed above, the system can also be used to notify transit riders of changes in the schedule of a bus due to a bus encountering a closed crossing.

As will be known by those of skill in the art, many municipal transit systems employ a variety of methods to notify transit riders of bus schedules in real time. For example, some have "smart signs" which include updated information on how long until the next bus on a particular route will reach that stop. Other methods include mobile applications which provide updated bus information for specific stops or will text in reply to a user request for schedule updates. These systems typically may rely on GPS or similar tracking of a bus along its route. However, many municipal transport systems are not equipped to determine how long a delay at a blocked crossing will be.

Accordingly, there is provided a method of updating a bus schedule comprising:

providing a railroad system comprising a plurality of monitored railroad grade crossings, each respective one monitored railroad grade crossing having associated therewith a monitor, said monitor arranged to detect an event at the respective one monitored railroad grade crossing, said event selected from closing of the associated railroad grade crossing or approach of a train to the associated railroad grade crossing, said monitor arranged to report said event to a control unit, said control unit comprising a database comprising a plurality of event entries, each respective event entry comprising the closing start time and the closing stop time of one event at a respective monitored railroad grade crossing closed by the one event; and a plurality of itinerary entries, each respective itinerary entry comprising closing start times and closing stop times at every respective monitored railroad grade crossing closed by the event; each respective railroad grade crossing being intersected by a roadway, said roadway being blocked when the railroad grade crossing is closed;

communicating an event at a monitor to the control unit, said control unit:

a) consulting the database to determine most frequent itinerary followed by a train from the respective monitored railroad grade crossing associated with said monitor;

b) calculating time of closure of railroad grade crossings associated with said predicted itinerary; and c) providing transit users with a notification of expected delays within a bus schedule while the bus is on route.

As discussed above, in another embodiment of the invention, the system is used to reduce traffic congestion associated with blocked railroad grade crossings. For example, the system may notify a traffic controller that a crossing that is currently blocked but about to clear will be blocked again shortly by another train. As a result of this information, the traffic controller can preferentially direct traffic that might otherwise be blocked by the second train through the crossing during the interval between the two events. Similarly, during periods of higher traffic volume, the traffic controller may preferentially direct traffic through the crossing immediately prior to an upcoming blockage, particularly a long blockage.

According to another aspect of the invention, there is provided a method of regulating traffic at a railroad grade crossing comprising:

providing a railroad system comprising a plurality of monitored railroad grade crossings, each respective one monitored railroad grade crossing having associated therewith a monitor, said monitor arranged to detect an event at the respective one monitored railroad grade crossing, said event selected from closing of the associated railroad grade crossing or approach of a train to the associated railroad grade crossing, said monitor arranged to report said event to a control unit, said control unit comprising a database comprising a plurality of event entries, each respective event entry comprising the closing start time and the closing stop time of one event at a respective monitored railroad grade crossing closed by the one event; and a plurality of itinerary entries, each respective itinerary entry comprising the closing start times and the closing stop times at every respective monitored railroad grade crossing closed by the event; each respective monitored railroad grade crossing being intersected by a roadway, said roadway being blocked when the railroad grade crossing is closed;

communicating an event at a monitor to the control unit, said control unit:

a) consulting the database to determine most frequent itinerary followed by a train from the respective monitored railroad grade crossing associated with said monitor;

b) calculating time of closure of railroad grade crossings associated with said predicted itinerary; and c) altering timing of traffic lights associated with each railroad grade crossing on said itinerary so that vehicles clear the crossing prior to closure of the railroad grade crossing.

In another embodiment of the invention, the system is used as a support tool for goods movement and freight logistics. For example, the system may be used to notify freight facilities that rely on train service for deliveries about the proximity of a train approaching their facility.

Accordingly, there is provided a method of notifying freight facilities and freight logistics companies about approaching trains comprising:

providing a railroad system comprising a plurality of monitored railroad grade crossings, each respective one monitored railroad grade crossing having associated therewith a monitor, said monitor arranged to detect an event at the respective one monitored railroad grade crossing, said event selected from closing of the associated railroad grade crossing or approach of a train to the associated railroad grade crossing, said monitor arranged to report said event to a control unit, said control unit comprising a database comprising a plurality of event entries, each respective event entry comprising the closing start time and the closing stop time of one event at a respective monitored railroad grade crossing closed by the one event; and a plurality of itinerary entries, each respective itinerary entry comprising the closing start times and the closing stop times at every respective monitored railroad grade crossing closed by the event; each respective monitored railroad grade crossing being intersected by a roadway, said roadway being blocked when the railroad grade crossing is closed;

communicating an event at a monitor to the control unit, said control unit consulting the database to determine if the predicted itinerary includes a stop at a freight facility of interest; and wherein if the itinerary includes said freight facility, informing the freight facility of the approaching trains.

As will be appreciated by one of skill in the art, this information allows freight facilities of an imminently approaching train in order to coordinate parallel services such as staffing, truck deliveries, and prepping equipment for loading/unloading.

As will be appreciated by one of skill in the art, the time of notification of the freight facility can be varied according to customer preference. For example, some facilities may prefer to be informed or notified when the train is approximately a certain distance away or a certain time away from the facility or as soon as the predicted itinerary has crossed a specific threshold, as discussed herein.

Figure 1:
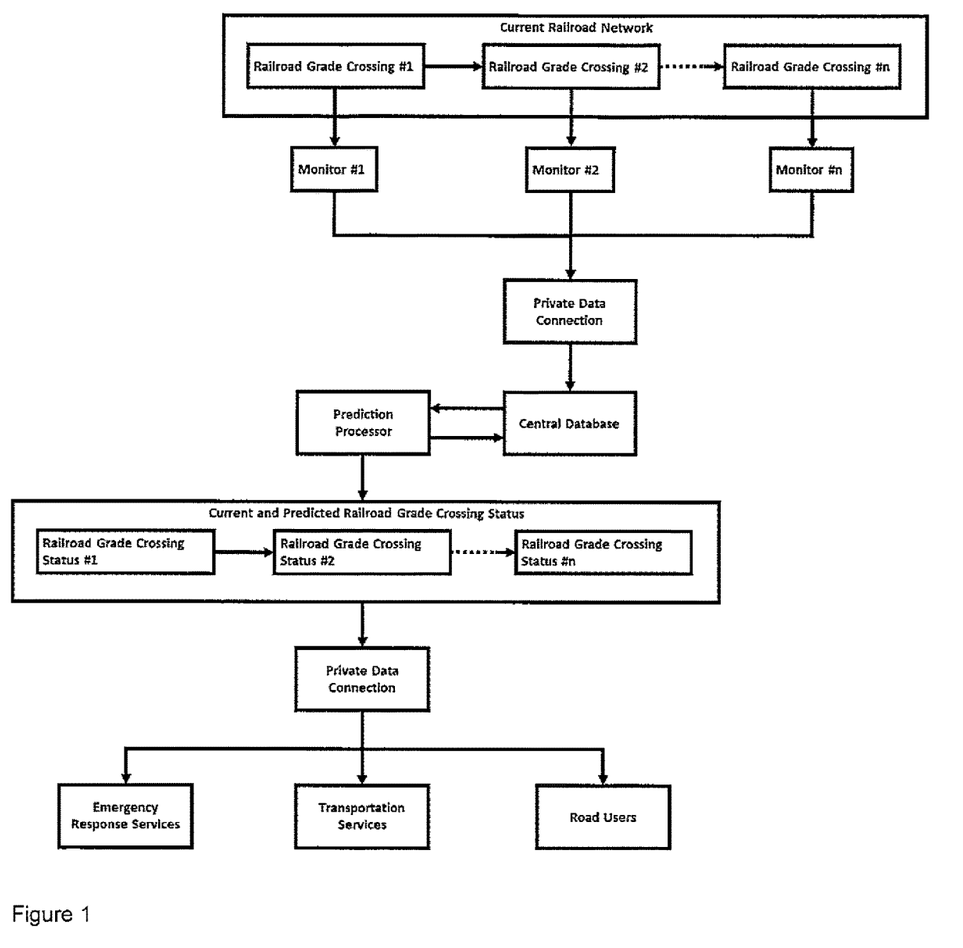
FIG. 1 is a block schematic diagram of the system correlating the monitoring system and communication of data to various road users.
Figure 2:
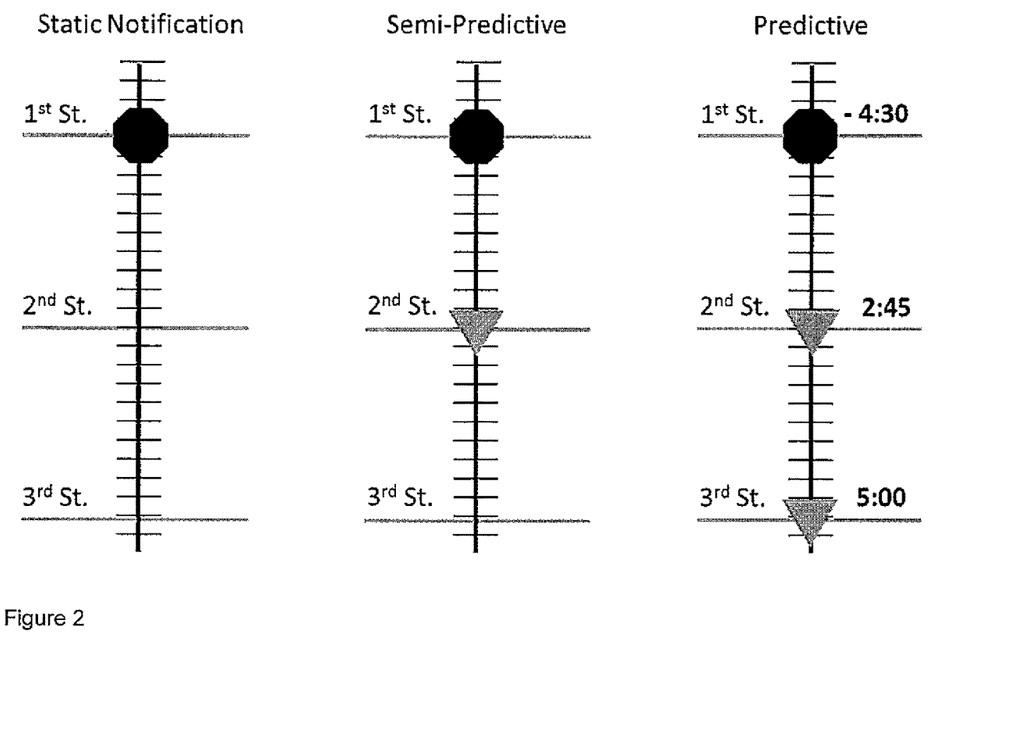
FIG. 2 is an example visualization of grade crossing data using non-predictive (static notification), semi-predictive, and predictive algorithms. The data could be visualized or presented in various formats and integrated into multiple software platforms.
Figure 3:
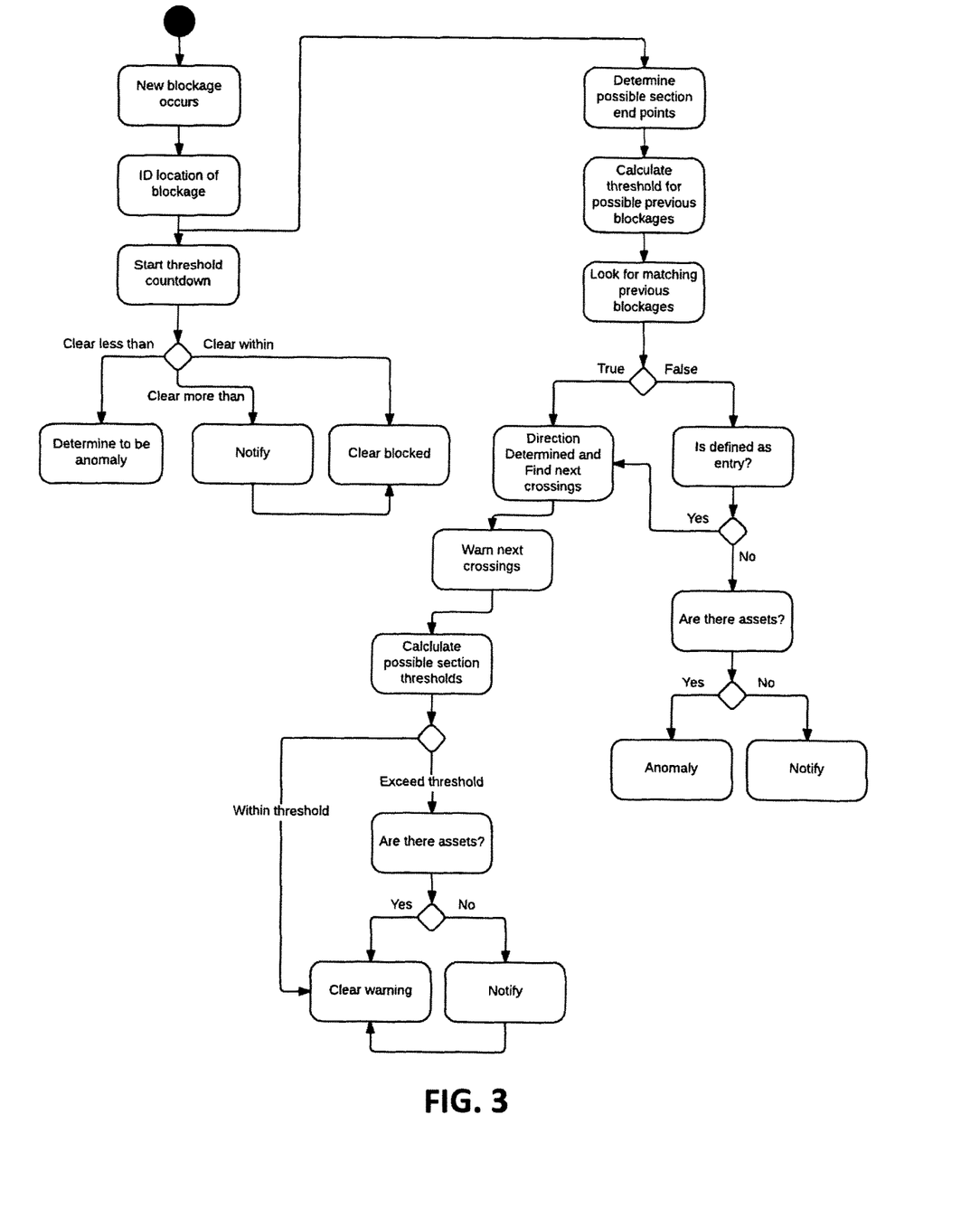
FIG. 3 is the activity diagram depicting the semi-predictive algorithm process flow.

FIG. 1 depicts the invention integrated with an interface for various end users which is intended for illustrative purposes. The interface or system being used by end users can vary. As an example, each grade crossing could be visualized in a map interface and the status of that crossing would be presented as a single point using any number of representative icons. FIG. 2 illustrates how the results of the system could be presented along a railroad track with multiple cross streets. In this diagram, a blocked grade crossing appears as an octagon and a grade crossing that is about to be blocked is visualized with an inverted triangle. As will be appreciated by one of skill in the art, other suitable symbols can be used within the invention.

Within a railroad network, any number of grade crossings can be equipped with a monitoring station to detect an event with the potential to block a grade crossing. Monitoring stations, also referred to as monitors, are configured in one of two ways.

Configuration one consists of installing equipment in municipal traffic control cabinets to monitor the incoming signals from the rail lines to initiate signal pre-emption. In this configuration, the equipment is required to fulfill two functions; monitor a unique electrical signal and wirelessly communicate data.

Configuration two consists of setting up equipment in locations where infrastructure is not available. In this configuration, the equipment is required to fulfill three functions; monitor a defined section of track for rail blockages, wirelessly communicate data, and self generate power to operate all equipment.

An increase in grade crossings equipped with monitors through a network will improve the overall accuracy of the system and provide more reliable predictive capabilities. Within the database, trends are developed on the spatial and temporal characteristics of blockages at each crossing and throughout the network in its entirety. Using these characteristics, predictive algorithms are applied against the data to determine the next grade crossing blockage, time until a blockage occurs at the predicted location, and elapsed time of blockage at current and predicted grade crossing locations.

The system collects and processes data in real-time to update current and predicted status of grade crossings (ability of a crossing to be traveled by a vehicle) in real-time or at pre-determined time intervals. The routing information is made available to the end user through an application program interface (API), or any other means of distribution, that allows the end user to view the information in their preferred medium.

FIG. 2 presents three possible uses of this data to meet the different needs of end users. The first use is a "static" notification system that outputs a message (either visually, through text, or other means) indicating when a grade crossing is currently blocked. The second use is a "semi-predictive" notification system that outputs a message (either visually, through text, or other means) indicating when a grade crossing is currently blocked and a warning indicating when other crossings are at risk of being blocked. Determining the next blocked grade crossing relies on the predictive algorithms discussed herein that learn the temporal and spatial characteristics of blocked crossings using historical data collected and integrated with information on railroad operations as discussed above. The third use is a "predictive" notification system that outputs the same message as the semi-predictive system but includes the time until a crossing is cleared and time until a crossing is occupied. This system requires in-depth analysis and the development of more complex algorithms that learn temporal and spatial characteristics of network operational changes to provide a higher level of accuracy for grade crossing activity.

All three possible uses follow a similar monitoring station data collection, wireless data communication, and remote data analysis process.

EXAMPLES

When an event is detected at a monitoring station (identified here as Crossing #1 for illustrative purposes), a signal is wirelessly transmitted to a central database indicating that Crossing #1 is blocked. Under all three systems highlighted in FIG. 2, users would be notified that Crossing #1 is blocked. For the semi-predictive system, users would be given a warning notification about a potential blockage on the next grade crossing; e.g., Crossing #2. The predictive system would also provide the elapsed time until Crossing #1 becomes clear and the elapsed time until Crossing #2 becomes blocked. As the railroad network is updated using the predictive algorithms, the information is distributed to end users through an API to integrate with their preferred medium.

As Crossing #1 is cleared, three procedures occur within the system: (1) Crossing #1 is given a status change to 'clear'; (2) actual clearance time for Crossing #1 is recorded and stored in the central database and compared against historical average clearance times for Crossing #1; and (3) algorithms modify predicted times for subsequent crossings as a function of the actual clearance time and expected travel time between crossings. The third procedure will result in modifications to the time intervals given in the predictive system by using a probabilistic approach to accommodate for changing railroad operational characteristics. Minimal changes would happen in the semi-predictive system unless the clearance time at Crossing #1 was indicative of an event that doesn't lead to subsequent blockages along the network. Once Crossing #2 is occupied, the process initiated when an event was detected at Crossing #1 would repeat. In the event that a subsequent crossing does not become blocked after it is giving a warning, the warning will clear after a threshold time interval determined by the predictive algorithms.

The outlined process is repeated as grade crossing events are recorded by the monitors and values updated and distributed to the end user by generating new data sets in real-time. The system learns, in real-time, the operational characteristics of a railroad network and modifies grade crossing blockage estimates to reflect changes in temporal and spatial characteristics.

The scope of the claims should not be limited by the preferred embodiments set forth in the examples, but should be given the broadest interpretation consistent with the description as a whole.

The invention claimed is:

1. A method of dispatching a vehicle to a destination comprising:
providing a railroad system comprising a plurality of monitored railroad grade crossings, each respective one monitored railroad grade crossing having associated therewith a monitor, said monitor detecting an event or receiving a signal that indicates that a portion of track is currently occupied by an object, said event selected from closing of the associated railroad grade crossing or approach of a train to the associated railroad grade crossing, said monitor reporting said event to a control unit, said control unit comprising a database comprising a plurality of event entries, each respective event entry comprising closing start time and closing stop time of a respective one train at a respective monitored railroad grade crossing closed on the route followed by the respective one train through the railway system; and a plurality of itinerary entries, each respective itinerary entry comprising the closing start times and the closing stop times at every respective monitored railroad grade crossing closed by the respective one train on the route followed by the respective one train through the railway system; each respective railroad grade crossing being intersected by a roadway, said roadway being blocked when the railroad grade crossing is closed;
a monitor communicating an event detected at the monitor to the control unit, said control unit:
a) consulting the database to determine most frequent itinerary followed by a train from the respective monitored railroad grade crossing associated with said monitor; and
b) reporting time of closure of railroad grade crossings associated with said predicted itinerary to a user; and
said user dispatching the vehicle to the destination on a route that avoids said closed railroad grade crossings.

2. The method according to claim 1 wherein the predicted itinerary is corrected to include railroad operations information.

3. The method according to claim 2 wherein the railroad operations information includes taking into account the temperature, current season, railroad speed limits, common train lengths, and location of assets.

4. The method according to claim 1 wherein the event entry comprises the time and date of the closing of the monitored railroad grade crossing and the time and date of reopening of the monitored railroad grade crossing.

5. The method according to claim 1 wherein the control unit applies a threshold value related to the predicted itinerary to the monitor and if the threshold value is not met, the control unit consults the database and selects a new predicted itinerary which is reported to users.

6. The method according to claim 5 wherein the assigning of a threshold value is repeated until the threshold value is met.

7. The method according to claim 1 wherein the vehicle is an emergency vehicle.

8. The method according to claim 1 wherein the respective one train is a manifest train, a unit train, a container train or a passenger train.

* * * * *